United States Patent [19]
Watanabe

[11] Patent Number: 5,828,296
[45] Date of Patent: Oct. 27, 1998

[54] VEHICULAR THEFT PREVENTIVE SYSTEM AND A THEFT DETERMINING DEVICE THEREOF

[75] Inventor: Motohiko Watanabe, Kobe, Japan

[73] Assignee: Mitsubishi Denki Kabushiki Kaisha, Tokyo, Japan

[21] Appl. No.: 633,207

[22] Filed: Apr. 16, 1996

[30] Foreign Application Priority Data

Dec. 1, 1995 [JP] Japan ................................ 7-314069

[51] Int. Cl.$^6$ .................................................. B60R 25/10
[52] U.S. Cl. ................ 340/426; 340/425.5; 340/430; 340/825.32; 307/10.2; 307/10.3
[58] Field of Search ............................. 340/425.5, 426, 340/430, 825.16, 825.32, 825.36; 307/10.2, 10.3, 10.4

[56] References Cited

U.S. PATENT DOCUMENTS

| | | | |
|---|---|---|---|
| 4,463,349 | 7/1984 | Mochida et al. | 340/825.32 |
| 4,492,959 | 1/1985 | Mochida et al. | 340/825.56 |
| 4,932,494 | 6/1990 | Chandler | 180/287 |
| 5,079,435 | 1/1992 | Tanaka | 307/10.2 |

FOREIGN PATENT DOCUMENTS 6227364  8/1994  Japan .

Primary Examiner—Jeffery A. Hofsass
Assistant Examiner—Daryl C. Pope
Attorney, Agent, or Firm—Sughrue, Mion, Zinn Macpeak & Seas, PLLC

[57] ABSTRACT

A vehicular robbery preventive system including a controlling means for controlling a vehicle; a robbery determining means for outputting a control allowance signal to the controlling means based on a signal inputted from outside; a restricting means for restricting-communication between the robbery determining means and the controlling means to a predetermined number of times or a predetermined period of time; and wherein the controlling means controls the vehicle when the control allowance signal is outputted from the robbery determining means to the controlling means within the predetermined number of times or the predetermined period of time.

6 Claims, 9 Drawing Sheets

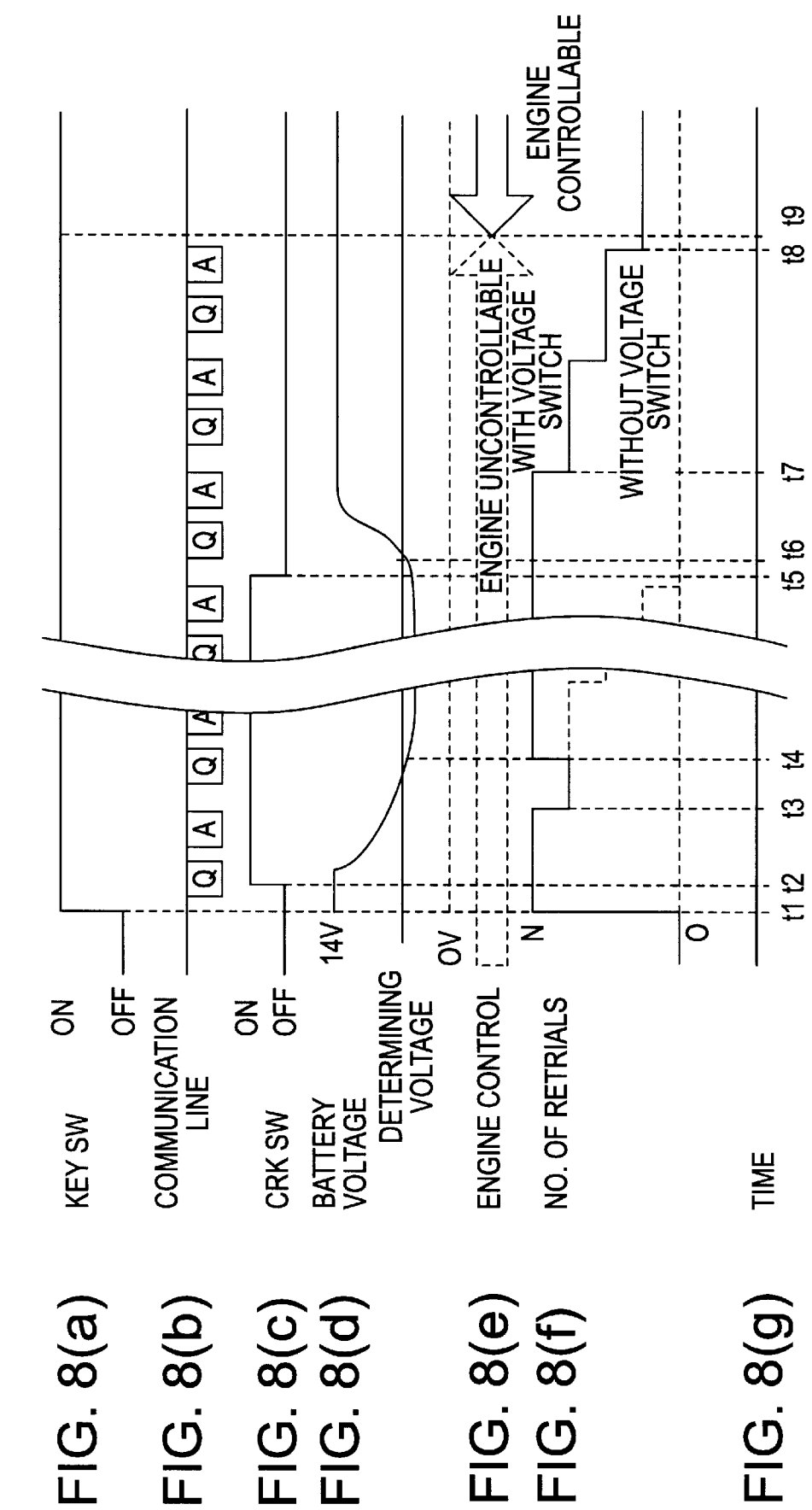

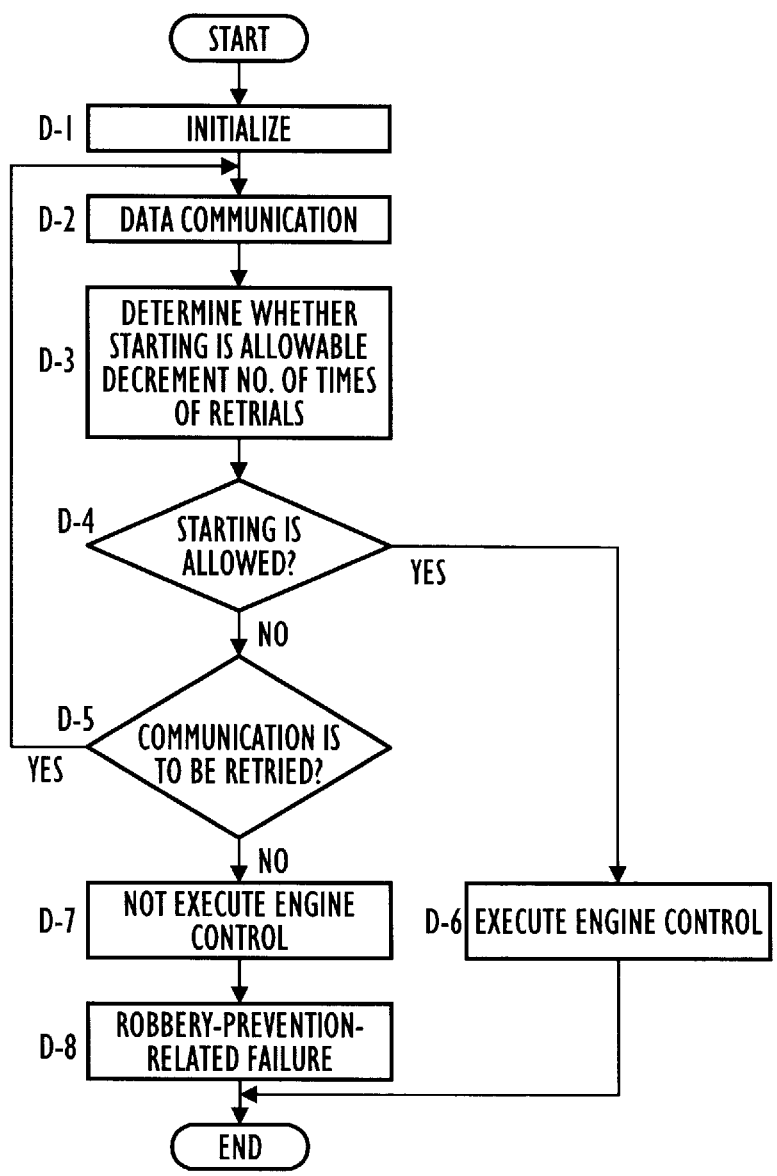

VEHICULAR THEFT PREVENTIVE SYSTEM AND A THEFT DETERMINING DEVICE THEREOF

BACKGROUND OF THE INVENTION

1. Field of the Invention

The present invention relates to a vehicular robbery preventive system and its robbery determining device having a function prohibiting or regulating movement of a vehicle by prohibition of starting an engine or the like when an automobile is going to be driven unfairly with a purpose of robbery or the like.

2. Discussion of the Background

Generally, methods of directly connecting of a starting circuit (starting power source), using a forged key and the like are conceivable as methods of robbing an automobile and a robbery preventive system capable of preventing robbery by these methods has been needed. In many of recent vehicles an amount of fuel supplied to an engine or the ignition timing of an engine can be controlled by an engine controlling device. Therefore, as is described, for example, in Japanese Unexamined Patent Publication No. 227364/1994, a robbery preventive system in which allowable or nonallowable information of starting which determines whether the starting is carried out by a proper key or not, is sent from a robbery determining device to an engine controlling device by an electronic means and the engine is started only in a state where it is started by a proper key by controlling fuel and ignition of an engine when information that starting is allowable is sent from the robbery determining device, has been conceived.

However, while the conventional robbery preventive system adopts a method in which the allowable or nonallowable information of starting is sent to the engine controlling device after it has been determined that the starting was performed by a proper key as mentioned above, a communication line used in the sending from the robbery determining device to the engine controlling means, can only be used for sending the allowable or nonallowable information to the engine controlling device. Therefore, it is necessary to install a new communication line when other communication is needed.

Further, even in case where the starting by a proper key is impossible by failure of the proper key or failure of the robbery determining device, the device determines that the starting has been tried by an improper key.

Further, although the engine cannot be controlled during a time period of determination on whether the starting is being performed by the proper key or not, the starter can be operated. Therefore, a battery voltage is lowered by the starter operation and the operation of the robbery determining device or the engine controlling device becomes unstable. Especially, when an amount of charge of the battery is small, the amount of charge of the battery is lowered by a repetitive starting operation and the battery may be exhausted.

SUMMARY OF THE INVENTION

The present invention has been performed to solve such problems and it is an object of the present invention to achieve effective use of a communication line, to be able to firmly prevent a vehicle from robbery and to prevent a battery from exhaustion.

According to a first aspect of the present invention, there is provided a vehicular robbery preventive system comprising a controlling means for controlling a vehicle; a robbery determining means for outputting a control allowance signal to the controlling means based on a signal inputted from outside; a restricting means for restricting communication between the robbery determining means and the controlling means to a predetermined number of times or a predetermined period of time; and wherein the controlling means controls the vehicle when the control allowance signal is outputted from the robbery determining means to the controlling means within the predetermined number of times or the predetermined period of time.

According to a second aspect of the present invention, there is provided a vehicular robbery preventive system according to the first aspect, wherein the controlling means counts a number of times of communication or a time period of communication between the robbery determining means and the controlling means, restricts the communication between the robbery determining means and the controlling means when the counted number of times of the communication or the time period of the communication becomes the predetermined number of times or the predetermined period of time and changes a counting operation by the restricting means based on a voltage supplied to the robbery determining means or the controlling means.

According to a third aspect of the present invention, there is provided a vehicular robbery preventive system according to the first aspect, wherein the robbery determining means includes a failure diagnosing means for performing a failure diagnosis of the robbery determining means by outputting a failure diagnosis signal to the robbery determining means, said failure diagnosing means outputting the failure diagnosis signal by using a communication route between the robbery determining means and the controlling means after the control allowance signal has been sent from the robbery determining means to the controlling means or after the communication between the robbery determining means and the controlling means has been restricted by the restricting means.

According to a fourth aspect of the present invention, there is provided a vehicular robbery preventive system according to the third aspect, wherein the failure diagnosing means does not output the failure diagnosis signal when the number of times of the communication or the time period of the communication which the restricting means has counted until the control allowance signal has been sent from the robbery determining means to the restricting means is in a predetermined range.

According to a fifth aspect of the present invention, there is provided a vehicular robbery preventive system comprising a controlling means for controlling a vehicle; a robbery determining means for communicating mutually with the controlling means and outputting a control allowance signal to the controlling means based on a signal inputted from outside; and wherein a communication operation of the robbery determining means or the controlling means is changed based on a voltage supplied to the robbery determining means or the controlling means.

According to a sixth aspect of the present invention, there is provided a vehicular robbery preventive system according to the first aspect, further comprising a key switch supplying power sources to the robbery determining means and the controlling means; a ID (identification) code receiving means for receiving a ID code from a key inserted to the key switch; and wherein the robbery determining means determines whether the ID code which the ID code receiving means receives is proper or not and outputs the control allowance signal to the controlling means if the ID code is proper.

According to a seventh aspect of the present invention, there is provided a robbery determining device of a vehicular robbery preventive system, said vehicular robbery preventive system comprising a determining means for determining whether a signal inputted from outside is a proper signal or not; an outputting means for outputting a control allowance signal to a controlling device controlling a vehicle based on a result of determination of the determining means; and a restricting means for counting a number of times of communication or a period of time of communication between the outputting means and the controlling device and restricting the communication with the controlling device after a predetermined number of times or a predetermined time period has elapsed.

BRIEF DESCRIPTION OF THE DRAWINGS

FIGS. 8(a), 8(b), 8(c), 8(d), 8(e), 8(f) and 8(g) illustrate timing charts showing the operation of a vehicular robbery preventive system according to the second embodiment of the present invention; and FIG. 9 is a flowchart showing the operation of an engine controlling device according to a third embodiment of the present invention.

DETAILED DESCRIPTION OF PREFERRED EMBODIMENTS

First embodiment

Figure 1:
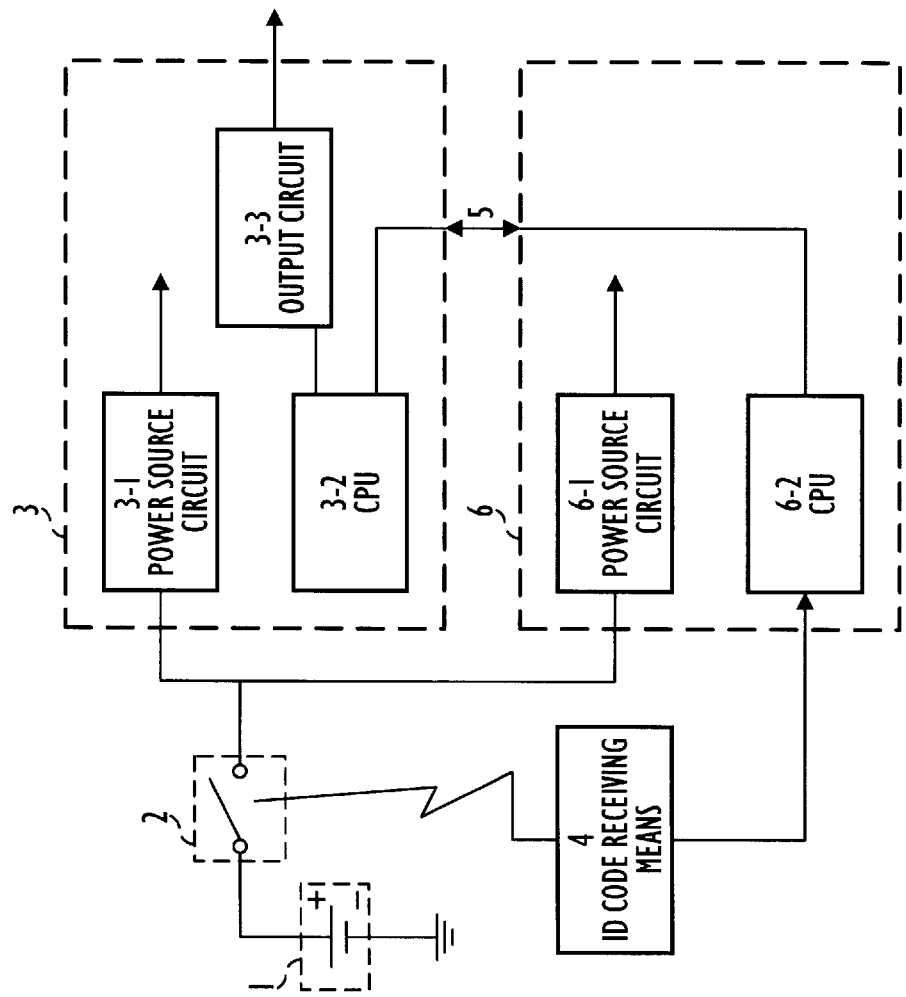
FIG. 1 is a block diagram showing a vehicular robbery preventive system according to a first embodiment of the present invention.

An explanation will firstly be given of the basic structure of a first embodiment. FIG. 1 is a block diagram showing a vehicular robbery preventive system according to the first embodiment. In FIG. 1 numeral 1 designates a battery. A battery normally used in an automobile generates a voltage of 14 V. Numeral 2 designates a key switch which is rendered ON by inserting a key (not shown) thereinto and turning it when a driver of an automobile operates an engine. At that time, as the key is being turned, accessory power sources (power sources of room lamp, clock etc.), an ignition power source and a starter power source are rendered ON in this order. Numeral 3 designates an engine controlling device as a controlling means or a controlling device. When the ignition power source is rendered ON by the key switch 2, power source is supplied to CPU 3-2 via a power source circuit 3-1, calculation is carried out in the CPU 3-2 and calculating result is outputted from an output circuit 3-3 to various actuators for engine control such as a throttle valve, ignition plugs etc. thereby controlling the engine. Further, the engine controlling device 3 also functions as a restricting means for counting a number of communication with a robbery determining device 6 (mentioned later) and restricting communication.

Numeral 4 designates a ID (identification) code receiving means which receives a signal (current, radio wave, magnetic field etc.) including a ID code (identification signal) outputted from the key inserted into the key switch 2 and sends it to the robbery determining device 6 (mentioned later). Numeral 5 designates a communication line as a communication route which is used for sending and receiving signals between the engine controlling device 3 and the robbery determining device 6. Numeral 6 designates a robbery determining device as a robbery determining means which determines whether the ID code received by the ID code receiving means 4 is proper or not and outputs a starting allowable signal as a control allowance signal to the engine controlling device 3 via the communication line 5 if the ID code is proper. Further, power source is supplied to a power source circuit 6-1 in the robbery determining device 6 when the ignition power source is rendered ON by the key switch 2.

A detailed explanation will be given further in reference to FIG. 1. When the ignition power source is rendered ON by the key switch 2, power source is supplied to the engine controlling device 3 and the robbery determining device 6 and a constant voltage (normally 5 V) is generated by the power source circuits 3-1 and 6-1 in the respective devices and is supplied to CPUs 3-2 and 6-2 in the respective devices. A circuit storing a ID code inherent to a vehicle which is respectively set to each vehicle is built in the key of the vehicle for robbery prevention that is inserted into the key switch 2. The ID code is read by the ID code receiving means 4 and is outputted to the robbery determining device 6. A program describing a control sequence for determining the ID code is included in CPU 6-2 incorporated in the robbery determining device 6. The program determines whether the received ID code is proper or not and executes a sequence outputting a starting allowable signal to the engine controlling device 3 by using the communication line 5 when it is proper.

Moreover, a program describing control sequences for determining the starting allowable signal and for controlling the engine is included also in CPU 3-2 incorporated in the engine controlling device 3. The program outputs signals for controlling the engine to actuators installed at various portions of the engine by the output circuit 3-3 after confirming that the starting allowable signal is received from the robbery determining device 6.

In case where the ID code is determined to be improper by the robbery determining device 6, the starting allowable signal is not outputted to the engine controlling device 3 and the signals for controlling the engine are not outputted from the engine controlling device 3 to various actuators and accordingly, the engine remains inoperable. In this way the allowable or nonallowable information of starting is sent from the robbery determining device 6 to the engine controlling device 3 depending on whether the starting allowable signal is outputted or not.

Figure 2:
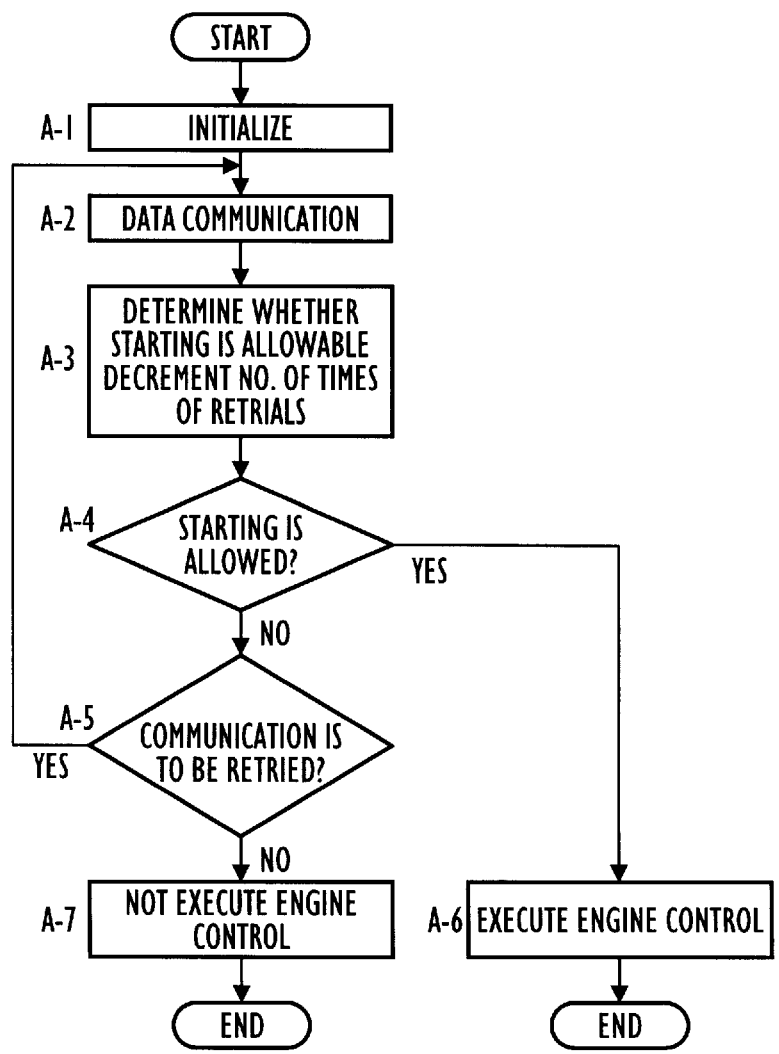
FIG. 2 is a flow chart showing the operation of an engine controlling device according to the first embodiment of the present invention.

Next, an explanation will be given of the operation of the engine controlling device 3. FIG. 2 is a flowchart showing the operation of the engine controlling device 3.

In FIG. 2, firstly, the key switch is rendered ON at "START", power source is supplied to the engine controlling device 3 and the program in CPU 3-2 is started. Further, initializing (processing A-1) setting related RAMs to predetermined initial values is performed. Next, data communication (processing A-2) with the robbery determining device 6 is carried out. Further, allowable or nonallowable determination of starting the engine is performed by determining whether the engine has been started by a proper key based on a result of the data communication with the robbery determining device 6 and at the same time a number of retrials (initial value N) as a number of times of communication is decremented one by one (processing A-3). When the starting is allowable (determination A-4), a normal engine control sequence (processing A-6) is executed and the operation is finished. Meanwhile, when the starting is nonallowable, the operation determines whether the retrial of communication is to be performed or not by determining the number of retrials (repetition) of communication is 0 or a value other than 0 (determination A-5) and performs again the data sending processing (processing A-2) in case of retrial. In case of no retrial the engine control is not executed (processing A-7) and the operation of the engine controlling device is finished. Here, the number of times of retrials is decremented one by one from the initial value N and when it becomes 0 the number of times of communication becomes a predetermined number of times (here, N times).

Figure 3:
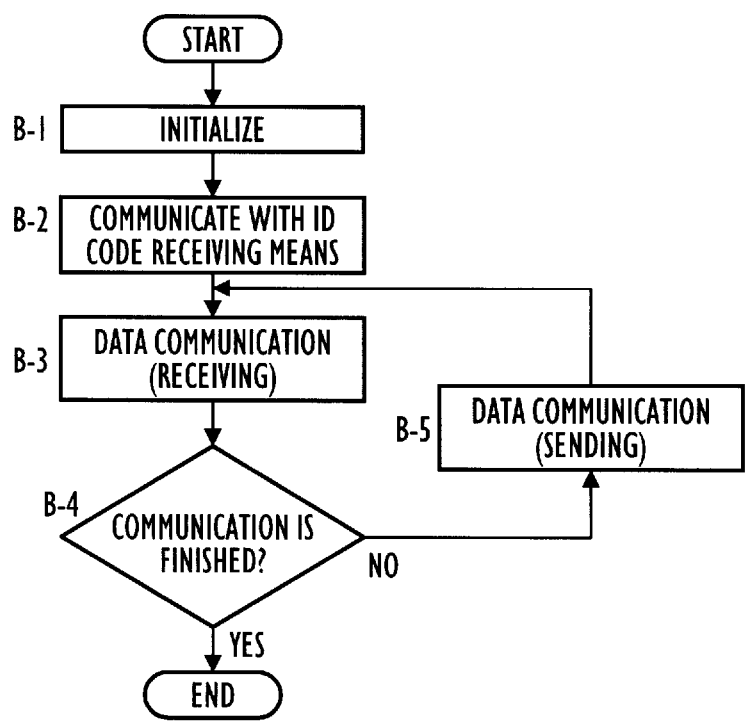
FIG. 3 is a flow chart showing the operation of a robbery determining device according to the first embodiment of the present invention.

An explanation will also be given of the operation of the robbery determining device 6. FIG. 3 is a flowchart showing the operation of the robbery determining device 6.

In FIG. 3 the key switch 2 is rendered ON, power source is supplied to the power source circuit 6-1 and a program in CPU 6-2 is started similar to the operational flowchart of the above-mentioned engine controlling device 3. Also, initializing (processing B-1) setting related RAMs to predetermined initial values is carried out. Next, communication (processing B-2) is carried out with the ID code receiving means 4 communicating with the key. However, if the ID code has not been received by the ID code receiving means 4 and the ID code has not been inputted to the robbery determining device 6 after a predetermined period of time has elapsed since the beginning of communication, the receiving operation with the ID code receiving means 4 is finished by determining as no reception.

Next, data is received from the engine controlling device 3 (processing B-3). Thereafter, the operation determines whether there is a signal indicating that the communication is finished in data sent from the engine controlling device (determination B-4) and finishes the processing when the communication has been finished. When the communication has not been finished, the robbery determining device 6 sends data of the starting allowable signal to the engine controlling device 3 (processing B-5) and data communication (receiving) is carried out again (processing B-3).

Figure 4:
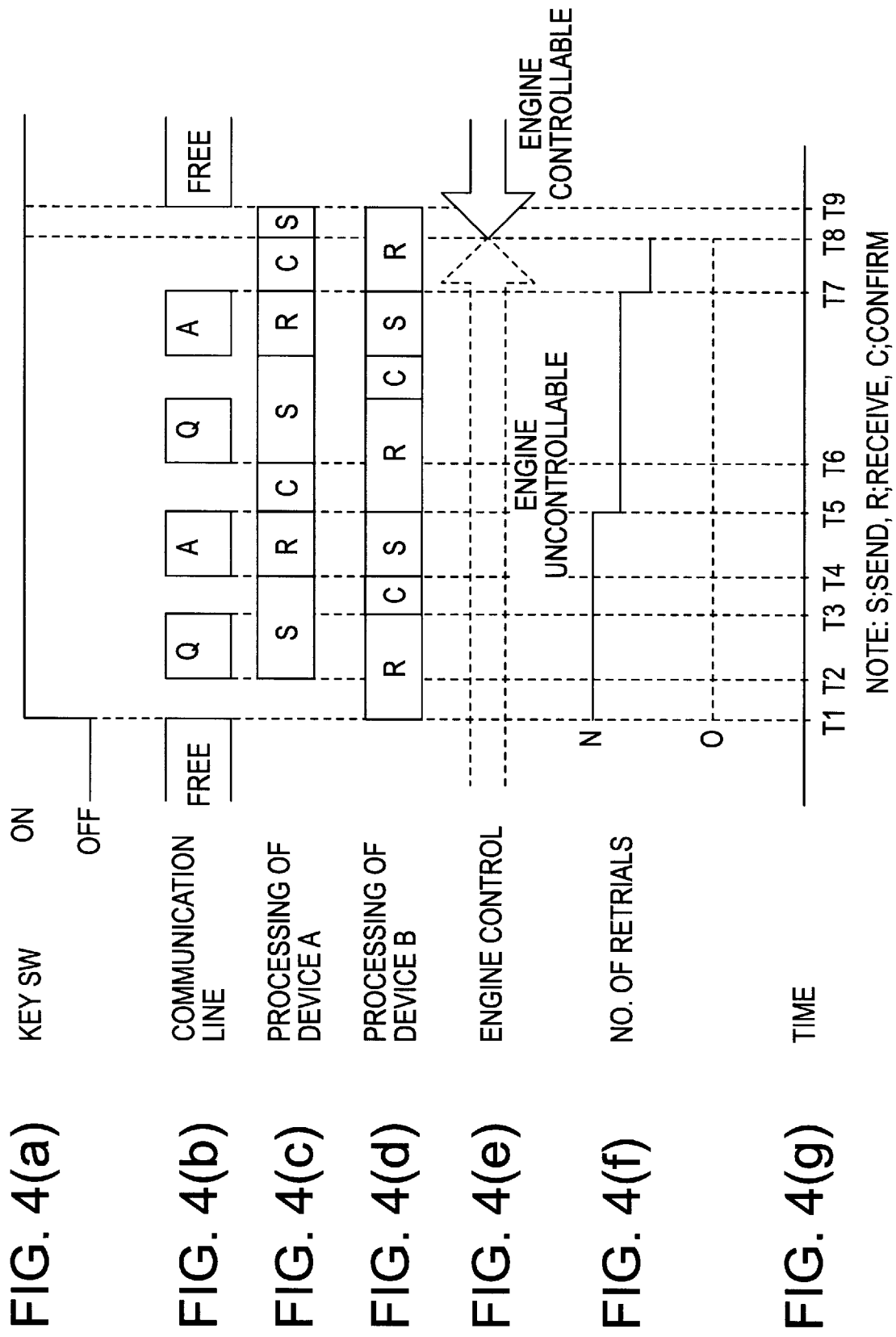
FIGS. 4(a), 4(b), 4(c), 4(d), 4(e), 4(f) and 4(g) illustrate timing charts showing the operation of the vehicular robbery preventive system according to the first embodiment of the present invention.
Figure 5:
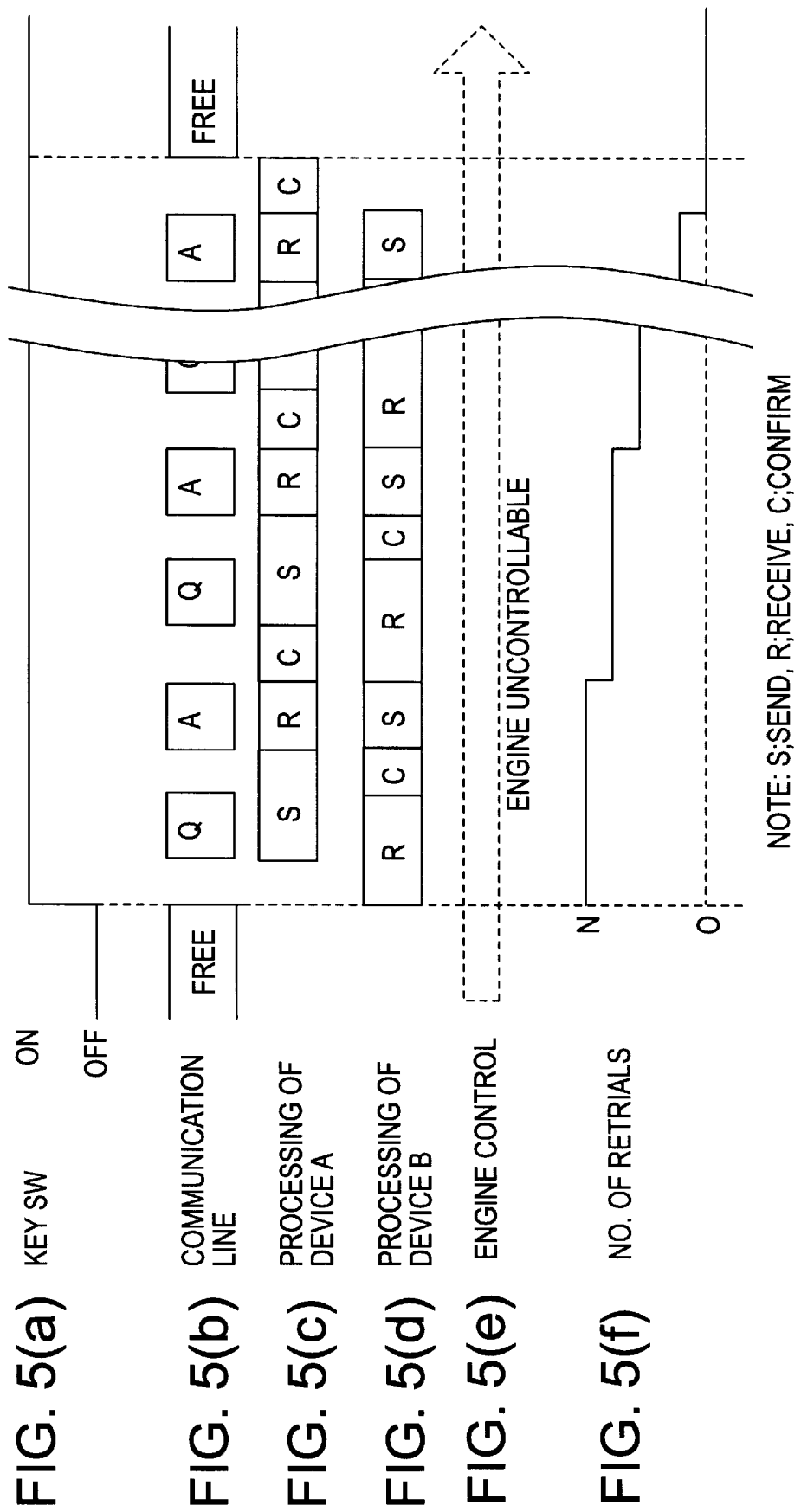
FIGS. 5(a), 5(b), 5(c), 5(d), 5(e) and 5(f) illustrate timing charts showing the operation of the vehicular robbery preventive system according to the first embodiment of the present invention.

A further detailed explanation will be given of the operation. FIGS. 4(a), 4(b), 4(c), 4(d), 4(e), 4(f) and 4(g) and FIGS. 5(a), 5(b), 5(c), 5(d), 5(e) and 5(f) illustrate timing charts showing the operation of the vehicular robbery preventive system. FIGS. 4(a), 4(b), 4(c), 4(d), 4(e), 4(f) and 4(g) show the operation in which the engine is controllable and 5(a), 5(b), 5(c), 5(d), 5(e) and 5(f) show a state where the engine is uncontrollable. FIG. 4(a) and FIG. 5(a) indicate ON/OFF states of the key switch 2, FIG. 4(b) and FIG. 5(b) indicate data communicated through the communication line 5, FIG. 4(c) and FIG. 5(c) indicate processing states of the engine controlling device (device A in figure) with respect to the communication line 5, FIG. 4(d) and FIG. 5(d) indicate processing states of the robbery determining device (device B in figure) with respect to the communication line 5, FIG. 4(e) and FIG. 5(e) indicate whether the engine controlling device 3 can control the engine or not, FIG. 4(f) and FIG. 5(f) indicate a number of times of trials and Figure (g) indicates time. Further, notation Q in FIG. 4(b) and FIG. 5(b) designates data sent from the engine controlling device 3 to the robbery determining device 6, notation A designates data sent from the robbery determining device 6 to the engine controlling device 3 and "FREE" designates that other communication can be performed by using the communication line 5.

An explanation will be given in reference to FIGS. 4(a), 4(b), 4(c), 4(d), 4(e), 4(f) and 4(g) and FIGS. 5(a), 5(b), 5(c), 5(d), 5(e) and 5(f).

Firstly, at T1 the key switch 2 is rendered ON (FIG. 4(a), FIG. 5(a)), a battery voltage (14 V) is supplied to the engine controlling device 3 and the robbery determining device 6 and the communication line 5 is in a state in which other communication cannot be carried out such that data communication between the robbery determining device 6 and the engine controlling device 3 can be performed. Further, initializing (processing A-1 in FIG. 2) is performed in the engine controlling device 3 and initializing (processing B-1 in FIG. 3) and communication with the ID code receiving means 4 (processing B-2) are carried out also in the robbery determining device 6. Next, at T2 the engine controlling device 3 sends a signal Q (signal requesting output of starting allowable signal) to the robbery determining device 6. Further, at T3 the robbery determining device 6 finishes receiving from the engine controlling device 3 and confirms whether there is a signal showing the finishing of communication in the signal Q (determination B-4). Here, the determination is NO and accordingly, the robbery determining device 6 sends a signal A with respect to the signal Q to the engine controlling device 3 (processing B-5).

At T5 the engine controlling device 3 finishes receiving the signal A and decrements by one the number of times of retrials (processing A-3) and confirms whether the starting allowable signal has been sent from the robbery determining device (determination A-4). Here, when the starting allowable signal has not been sent, the engine controlling device 3 confirms whether the communication is to be retried (determination A-5) and performs again the sending at T6 when the retrial is to be performed. The above operation is continued before or until the number of times of retrials becomes 0.

Further, as shown in FIG. 5(e), when the engine is uncontrollable at a time point when the number of times of retrials becomes 0, the operation is finished as it is and the engine remains uncontrollable.

Next, at T7, when it is determined that the starting allowable signal has been sent from the robbery determining device 6 (YES in determination A-4), the engine control signals are outputted to the respective actuators from the output circuit 3-3 of the engine controlling device 3 and the engine becomes controllable at T8 (processing A-6). Further, a signal indicating the finishing of communication is sent from the engine controlling device 3 to the robbery determining device 6 and at T9 the robbery determining device 6 determines that the communication is finished (determination B-4) and the processing of the robbery determining device with respect to the communication line 5 is finished.

Further, at the same time the processing of the engine controlling device with respect to the communication line 5 is also finished and the communication line 5 is in a state of "FREE".

When the communication line 5 is in the state of FREE, it can be used for failure detection of interface (communication line) (including the communication line 5) between the engine controlling device (ECI) 3 and the robbery determining device 6, detection of failure of the robbery determining device 6 (failure of the ID code detecting means 4, communication failure, communication abnormality etc. between the ID code detecting means 4 and the robbery determining device 6) or the like.

Further, a failure diagnosing means performing failure diagnosis of the robbery preventive system can diagnose failure by outputting a failure diagnosis signal to an object of failure diagnosis. For example, when a failure diagnosing means is provided at the ID code receiving means 4, disconnection of the communication line, abnormality of a clock in each CPU etc. can be detected by outputting a failure diagnosis signal to the robbery determining device 6 and the engine controlling device 3. Further, failures at the robbery determining device 6 and at the engine controlling device 3 can simultaneously be diagnosed by only providing a single failure diagnosing means by utilizing the communication line 5 between the robbery determining device 6 and the engine controlling device 3.

As stated above, according to the first embodiment the number of times of processing the communication between the engine controlling device 3 and the robbery determining device 6 is restricted by which the communication line 5 is not occupied by the communication for the robbery preventive operation but can be utilized as other controlling communication line (for example, communication line monitoring engine control information) when it is not used in the robbery preventive operation thereby achieving effective utilization of the communication line 5.

Further, according to the first embodiment, although the communication is restricted by the number of times of retrials, the communication may be restricted by a length of a period of time spent by communication (communication time period). In this case a timer may be installed to the engine controlling means and the communication period of time may be counted by the timer and the communication may be restricted when the communication period of time becomes a predetermined time period.

Further, according to the first embodiment the engine is in a controllable state after the system confirms that a proper key has bee used. However, it may be performed that firstly the engine is rendered in the controllable state, thereafter the communication is performed between the engine controlling device 3 and the robbery determining device 6 and the engine control is discontinued when it is determined that the starting has been performed by an improper key as a result of the communication. In this case the engine is firstly controlled and accordingly, the engine can swiftly be started. At this occasion a time period until movement of a vehicle by an improper key is rendered impossible can be adjusted by adjusting the number of times of retrials N or the communicatable time period. And erroneous robbery preventive operation can firmly be reduced by increasing the number of times of retrials N or the communicatable time period. In this way it is possible to prevent erroneous operation of robbery preventive function and also accelerate execution of engine control by restricting the number of times of retrials in communication.

Figure 6:
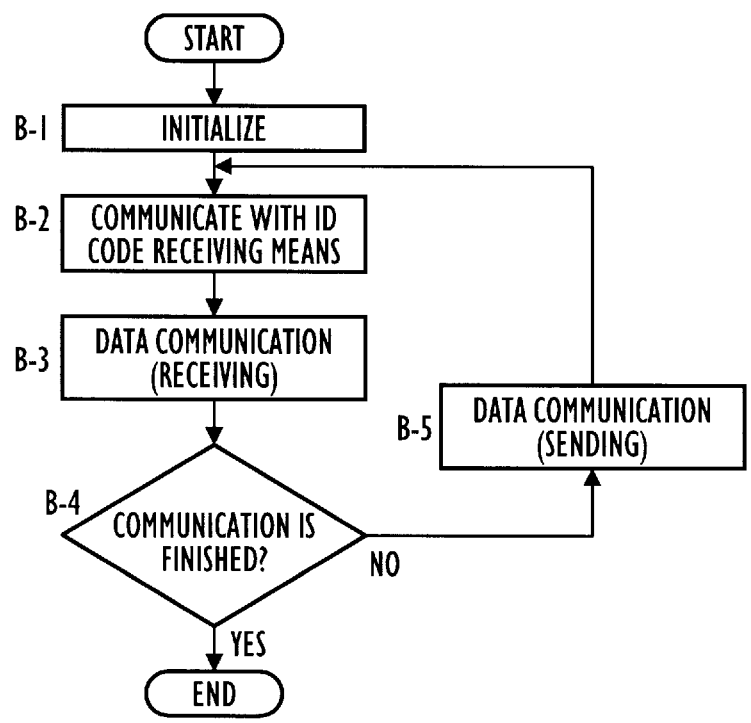
FIG. 6 is a flowchart showing the operation of the engine controlling device according to the first embodiment of the present invention.

Further, according to the first embodiment the processing B-3, the processing B-4 and the processing B-5 are repeated as shown in FIG. 3. However, as shown in FIG. 6, the processing B-2 and the processings B-3, B-4 and B-5 may be repeated by repeating also the communication with the ID code receiving means 4 (processing B-2). In this case it is possible to prevent to erroneously determine a proper key as an improper key by trying again the ID code reception even if the ID code receiving means 4 fails to receive the ID code by influence of other electromagnetic wave etc.

Second embodiment

A vehicular robbery preventive system according to a second embodiment is different from the above-mentioned vehicular robbery preventive system according to the first embodiment only in the operation of the engine controlling device 3. Therefore, a portion having a structure the same as that in the first embodiment is attached with the same notation and the explanation will be omitted.

Figure 7:
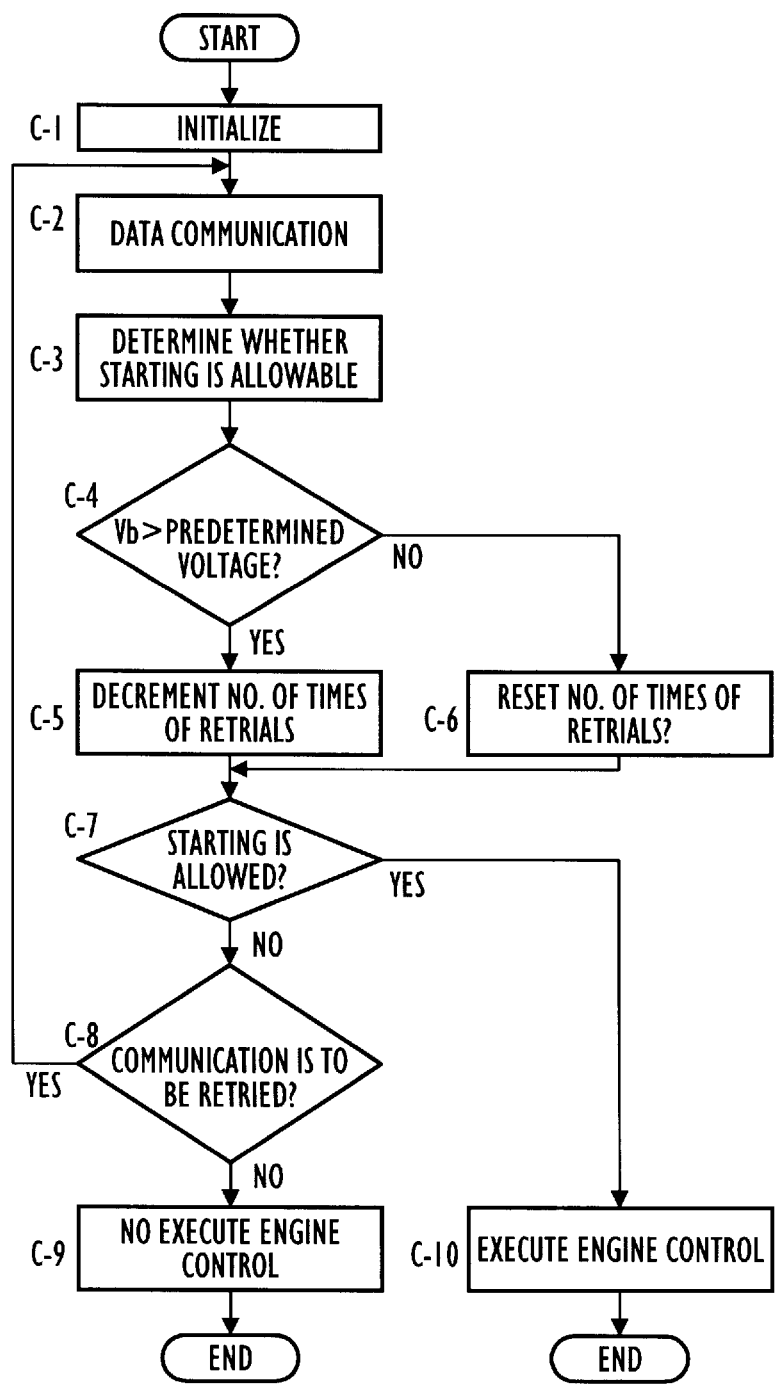
FIG. 7 is a flowchart showing the operation of an engine controlling device according to a second embodiment of the present invention.

FIG. 7 is a flowchart showing the operation of the engine controlling device 3 according to the second embodiment. Firstly, similar to the first embodiment the key switch 2 is rendered ON and a program in CPU 3-2 is started. Next, the initializing operation which sets related RAMs to predetermined initial values is performed (processing C-1). Next, data communication with the robbery determining device 6 is performed (processing C-2). Further, the operation determines whether the starting has been performed by a proper key based on a result of the data communications from the robbery determining device 6 and performs allowable or nonallowable determination of the starting (processing C-3).

Next, if a value of a battery voltage detected and calculated by CPU 3-2 is a predetermined voltage or more (YES in determination C-4) the number of times of retrials is decremented (decremented by one) (processing C-5). Otherwise (NO in determination C-4) the number of times of retrial is reset into the initial value N (processing C-6). Next, when the starting allowable signal is outputted from the robbery determining device 6 (YES in determination C-7), the operation executes the normal engine control sequence (processing C-10). When the starting is unallowable (NO in determination C-7), the operation determines whether the retrial of communication is to be performed by confirming the number of times of retrials (determination C-8) and again sends data in case of retrial (processing C-2). Otherwise the engine control is not executed (processing C-9) and the program is finished.

Here, the control flow of the robbery determining device in the second embodiment is the same as that in the first embodiment and the explanation will be omitted.

Next, an explanation will be given of the operation. FIGS. 8(*a*), 8(*b*), 8(*c*), 8(*d*), 8(*e*), 8(*f*) and 8(*g*) illustrate timing charts showing the operation of a vehicular robbery preventive system according to the second embodiment. FIG. 8(*a*) indicates ON/OFF of the key switch, FIG. 8(*b*) indicates communication states at the communication line 5, in which notation Q in FIG. 8(*b*) designates data-sent from the engine controlling device 3 to the robbery determining device 6 and notation A designates data sent from the robbery determining device 6 to the engine controlling device 3. FIG. 8(*c*) indicates ON/OFF of a cranking switch (CRK SW) (that is, a switch for activating a starter power source), FIG. 8(*d*) indicates a battery voltage, FIG. 8(*e*) indicates allowability or nonallowability of engine control, FIG. 8(*f*) indicates a number of times of communication retrials and FIG. 8(*g*) indicates time.

In these figures, at t1 the key switch 2 is rendered ON, a battery voltage (14 V) is supplied to the engine controlling device 3 and data communication is performed between the robbery determining device 6 and the engine controlling device 3. That is, as shown in FIG. 8(*b*) the engine controlling device 3 sends a signal Q and with respect thereto the robbery determining device 6 sends a signal A.

Next, at t2 the cranking switch is rendered ON. Normally the cranking switch can be rendered ON when a driver of an automobile turns the key further from a state in which the key switch is rendered ON and the starter is operated by rendering ON the cranking switch. However, even if the starter is operated, ignition or the like is not performed and the engine is not operated when the engine is not controlled. Also, in operating the starter power is supplied from the battery 1 to the starter and accordingly, the battery voltage supplying to the engine controlling device 3 is lowered. Next, at t3 the battery voltage is a determining voltage or more and accordingly, the number of times of retrials is decremented by one.

At t4 the battery voltage is the determining voltage or less and accordingly, the number of times of retrials is reset to the initial value N. Next, at t5 the cranking switch is rendered OFF and the operation of the starter is stopped and accordingly, the battery voltage gradually recovers and becomes the determining voltage or more at T6. Further, at t7 the battery voltage is the determining voltage or more and therefore, the number of times of retrials is decremented by one.

Further, at t8 the engine starting allowable signal is inputted to the engine controlling device 3 and at t9 the engine becomes controllable.

Since the second embodiment is constructed as above, even if a driver performs the key operation and the cranking operation, to prevent erroneous operation due to deterioration of reliability of various devices caused by lowering of the battery voltage, when the battery voltage is the determining voltage or less, the number of times of retrials of communication is recovered to the initial value N as shown by FIG. 8(f) by which the number of times of retrials is increased and erroneous operation of the robbery preventive processing can be reduced.

Further, in case where the battery supplying to the engine controlling device 3 and the like is lowered by the operation of the starter when the robbery preventive processing is being performed in the second embodiment, the lowering of the battery voltage can also be prevented by stopping supply of power from the battery 1 to the starter.

Further, although the number of times of retrials of communication is recovered to the initial value when the battery voltage is a predetermined voltage or less in the second embodiment it may be carried out that the number of times of retrials of communication is not reduced and stays as it is and is decremented from a preserved value when the battery voltage is the predetermined voltage or more. That is, the counting of the number of times of retrials may be stopped when the battery voltage is the predetermined voltage or less. Thereby, when the operation of CPU is unstable since the battery voltage is the predetermined voltage, erroneous operation can be prevented by stopping the counting operation.

Further, in case where a driver performs the cranking operation by operating the key during a time period until the engine controlling device 3 receives the starting allowable signal from the robbery determining device 6, the battery voltage is lowered and resetting occurs at either of CPU 6-2 of the robbery determining device 6 and CPU 3-2 of the engine controlling device 3, the communication is performed in the reset device after a processing sequence such as initializing has been restarted. That is, the timing of communication is shifted by a time period required for an initial processing such as the initializing etc. and collision of communication occurs between the engine controlling device 3 and the robbery determining device 6. Therefore, normal communication cannot be performed, erroneous operation is caused and starting by a proper key may have been determined as improper.

However, according to the second embodiment, when the battery voltage is within a predetermined range (that is a range in which resetting is likely to occur), the communication operation is discontinued by which the timing of communication is not shifted and no collision of communication occurs and accordingly, erroneous operation is not caused.

Further, although the collision of communication caused by resetting is prevented in the second embodiment, it may be carried out that communication state between the engine controlling device 3 and the robbery determining device 6 is confirmed and whether exchange of information is correctly performed, is confirmed by which whether the collision of communication occurs, is detected and the number of times of retrials is reset when the collision of communication occurs.

Third embodiment

A vehicular robbery preventive system in a third embodiment differs from the vehicular robbery preventive system in the above-mentioned first embodiment in the operation of the engine controlling device 3. Therefore, other portion having the same structure as that in the first embodiment is attached with the same notation and the explanation will be omitted.

FIG. 9 is a flowchart showing the operation of the engine controlling device in the third embodiment. In FIG. 9, similar to the first embodiment, the key switch 2 is firstly rendered ON and programs in CPU 3-1 are started. Further, the initializing operation (processing D-1) setting related RAMs to predetermined initial values is performed. Next, the data communication (processing D-2) with the robbery determining device 6 is performed. Thereafter, the operation determines whether the starting has been performed by a proper key based on the result of the data communication with the robbery determining device 6, performs allowable or nonallowable determination of starting and decrements the number of times of retrials at the same time (processing D-3). Next, when the starting is allowable (YES in determination D-4), the normal engine control sequence is executed (processing D-6). Further, when the starting is unallowable (NO in determination D-4), the operation determines whether the communication is to be retried based on the number of times of retrials of communication (processing-D-5) and sends again data in case of retrial (processing D-2).

Next, when the retrials of communication have been finished by a predetermined number of times (determination D-7), the engine control is not executed and the operation determines a robbery-prevention-related failure (processing D-8). Here, the robbery-prevention-related failure can be confirmed by using the communication line 5. Further, when failure is detected in the processing D-8, a processing such as performing a display indicating failure etc. may be carried out. Further, a display of failure location may be performed at this time.

Further, in performing the failure detection the occurrence of failure is stored in a failure history memory and the number of times of communication or the time period of communication between the engine controlling device 3 and the robbery determining device 6 is simultaneously stored.

When resetting occurs in CPU, the number of times of communication or the time period of communication after the resetting is stored and accordingly, failure can correctly be stored. Also, the occurrence of resetting can be stored.

According to the third embodiment failure is displayed in case where the engine control is not executed even with a proper key by the robbery-prevention-related failure and therefore a user is not perplexed.

Further, it may be carried out in the third embodiment that, when the number of times of retrials of communication until the execution of the engine control is other than 0 after the engine control has been executed in the processing D-6, the determination of the robbery-prevention-related failure (determination D-8) is performed and when the number is 0, the determination is not executed and the program is finished.

Although the power source circuits of their own are provided respectively to the engine control device and the robbery determining device in the above-mentioned respective embodiments, they may be shared. Further, CPU of the engine controlling device and CPU of the robbery determining device may be shared. In this case the communication may be performed between a portion in CPU corresponding to the engine controlling device and a portion thereof corresponding to the robbery determining device.

Although communication is performed between the engine controlling device and the robbery determining device by a single communication line in the above-mentioned respective embodiments, the communication may be performed by using a plurality of communication lines. Further, although the communication is performed alternatingly, the sending and receiving may be performed simultaneously on both sides.

Although the vehicular robbery preventive system using the engine control device has been shown in the above-mentioned respective embodiments, a system may be used so far as it is controllable for preventing a vehicle from robbery. For example, a vehicular robbery preventive system using a control device performing a rotational control of a motor may be used in a motor-driven vehicle.

The engine control device may perform control of the starter in the above-mentioned respective embodiments. In this case the starter is not operated if the robbery determination is not performed and accordingly, lowering of the battery voltage does not occur.

The ID code receiving means and the robbery determining device may be installed in the same cabinet or the same circuit in the above-mentioned respective embodiments.

Although the ID code is inputted from a key in the above-mentioned respective embodiments, the inputting may be performed by, for example, an inputting means such as a key board mounted on a vehicle etc. or an input by radio wave.

Although the engine controlling device as the restricting means counts the number of times of communication or the time period of communication between the engine controlling device and the robbery determining device and restricts communication in the above-mentioned respective embodiments, the robbery determining device, for example, may perform the above-mentioned operation as the restricting means. Further, the restricting means may separately be provided, for example, in the midway of the communication line.

What is claimed is:

1. A vehicular theft preventive system comprising:
   a controlling means for controlling a vehicle;
   a theft determining means for outputting a control allowance signal to the controlling means based on a signal inputted from outside the vehicle;
   a communication line connected to the controlling means and the theft determining means; and
   a restricting means for restricting communication of theft determination information between the theft determining means and the controlling means over said communication line to a predetermined number of times or a predetermined period of time, but allowing unrestricted communications over said communication line for purposes unrelated to theft prevention;
   wherein the controlling means controls the vehicle when the control allowance signal is outputted from the theft determining means to the controlling means within the predetermined number of times or the predetermined period of time.

2. The vehicular theft preventive system according to claim 1, wherein the controlling means counts a number of times of communication or a time period of communication between the theft determining means and the controlling means, restricts the communication between the theft determining means and the controlling means when the counted number of times of the communication or the time period of the communication becomes the predetermined number of times or the predetermined period of time and changes a counting operation by the restricting means based on a voltage supplied to the theft determining means or the controlling means.

3. The vehicular theft preventive system according to claim 1, further comprising:
   a key switch supplying power sources to the theft determining means and the controlling means;
   a ID (identification) code receiving means for receiving a ID code from a key inserted to the key switch; and
   wherein the theft determining means determines whether the ID code which the ID code receiving means receives is proper or not and outputs the control allowance signal to the controlling means if the ID code is proper.

4. The vehicular theft preventive system comprising:
   a controlling means for controlling a vehicle;
   a theft determining means for outputting a control allowance signal to the controlling means based on a signal inputted from outside;
   a restricting means for restricting communication between the theft determining means and the controlling means to a predetermined number of times or a predetermined period of time; and
   wherein the controlling means controls the vehicle when the control allowance signal is outputted from the theft determining means to the controlling means within the predetermined number of times or the predetermined period of time,
   wherein the theft determining means includes a failure diagnosing means for performing a failure diagnosis of the theft determining means by outputting a failure diagnosis signal to the theft determining means, said failure diagnosing means outputting the failure diagnosis signal by using a communication route between the theft determining means and the controlling means after the control allowance signal has been sent from the theft determining means to the controlling means or after the communication between the theft determining means and the controlling means has been restricted by the restricting means.

5. The vehicular theft preventive system according to claim 4, wherein the failure diagnosing means does not output the failure diagnosis signal when the number of times of the communication or the time period of the communication which the restricting means has counted until the control allowance signal has been sent from the theft determining means to the restricting means is in a predetermined range.

6. The vehicular theft preventive system according to claim 1, further comprising:

a battery voltage detector; and wherein operation of the restricting means is changed based on a voltage detected by the battery voltage detector so as to allow further communication over the communication line for theft determination when the battery voltage falls below a predetermined level.

* * * * *